(12) United States Patent
Opfel

(10) Patent No.: US 6,810,831 B1
(45) Date of Patent: Nov. 2, 2004

(54) ANIMAL ARENA SURFACE AMENDMENT

(75) Inventor: William Opfel, Mesa, AZ (US)

(73) Assignee: Equidry Bedding Products, LLC, Phoenix, AZ (US)

( * ) Notice: Subject to any disclaimer, the term of this patent is extended or adjusted under 35 U.S.C. 154(b) by 0 days.

(21) Appl. No.: 10/158,676

(22) Filed: May 29, 2002

(51) Int. Cl.[7] .............................................. A01K 1/015
(52) U.S. Cl. ..................... 119/171; 119/173; 119/486; 428/150; 106/486
(58) Field of Search .................. 119/171, 703, 119/172, 173; 106/900, 416, 486; 71/62, 63; 404/17, 20; 428/150, 143; 501/145, 150; 423/324; 432/13, 52

(56) References Cited

U.S. PATENT DOCUMENTS

| | | | | |
|---|---|---|---|---|
| 3,891,382 A | * | 6/1975 | Lawall et al. | 432/58 |
| 4,337,283 A | * | 6/1982 | Haas, Jr. | 428/17 |
| 4,628,042 A | * | 12/1986 | Speronello | 502/263 |
| 4,704,989 A | * | 11/1987 | Rosenfeld | 119/173 |
| 4,819,933 A | * | 4/1989 | Armond | 472/92 |
| 4,824,810 A | | 4/1989 | Lang et al. | |
| 5,013,349 A | * | 5/1991 | Tanaka | 71/27 |
| 5,014,462 A | | 5/1991 | Malmgren et al. | |
| 5,020,936 A | | 6/1991 | Malmgren et al. | |
| 5,151,123 A | * | 9/1992 | Kviesitis | 106/287.17 |
| 5,177,036 A | * | 1/1993 | Kunst et al. | 501/84 |
| 5,264,029 A | | 11/1993 | Kviesitis | |
| 5,276,205 A | * | 1/1994 | Fisher | 568/637 |
| 5,329,880 A | | 7/1994 | Pattengill et al. | |
| 5,358,607 A | | 10/1994 | Ellis | |
| 5,402,752 A | | 4/1995 | Hahn et al. | |
| 5,418,195 A | * | 5/1995 | Kostuch et al. | 501/80 |
| 5,577,463 A | * | 11/1996 | Elazier-Davis et al. | 119/173 |
| 5,961,389 A | | 10/1999 | Dickinson | |
| 6,019,063 A | | 2/2000 | Haubensak et al. | |
| 6,071,039 A | | 6/2000 | Ogura et al. | |
| 6,096,126 A | | 8/2000 | Tanner et al. | |
| 6,155,749 A | | 12/2000 | Tanner et al. | |
| 6,358,312 B1 | * | 3/2002 | Tanner et al. | 106/416 |
| 2001/0029762 A1 | * | 10/2001 | Steele et al. | 71/63 |

OTHER PUBLICATIONS

Balcones Minerals Corp. products sheet pp. 1–4, http://www.balconesmineral.com.*

"Installing a Training Track", Thoroughbred Times, Henry Q. Murphy, www.horsemenstrack.com/magazine.html, May 10, 2002.

* cited by examiner

Primary Examiner—Yvonne R. Abbott
(74) Attorney, Agent, or Firm—Schmeiser Olsen & Watts, LLP (57) ABSTRACT

A soil amendment for use in the running surface of an animal competition arena comprises highly absorbent and durable calcined clay granules. The clay granules are porous and contain micropores and microstructures to capture and retain moisture for release over time. Additionally, because the clay granules are formed of a particularly hard calcined clay, they are sufficient to support the weight of even heavy animals even when mixed with soft soil such as sand. Methods of fabricating the soil amendment and amending soil include methods which provide the soil amendment granules and arena surface with selected hardness and porosity for the particular soil and use of the arena surface.

63 Claims, 4 Drawing Sheets

ANIMAL ARENA SURFACE AMENDMENT

BACKGROUND OF THE INVENTION

1. Technical Field

This invention relates to animal competition arenas, and more particularly to a calcined clay surface amendment for an animal arena which provides a supportive yet soft track surface which quickly absorbs moisture and releases it slowly over time.

2. Background Art

Competition involving animals has been popular for centuries and, depending upon the size of the animals participating, often involve large arenas. As used herein, an "arena" includes any area in which a competition is engaged. Examples of animal competitions which provide some examples of arenas include, but are not limited to, animal racing, steeple chasing, polo, barrel racing, steer roping, animal showing, rodeos, training for competition, and the like. While the effect of arena surfaces on the physiology of the animal competitors was overlooked for years, more recent animal physiologists have emphasized the importance of protecting the animals' physiological health during competition. As a result, for example, many racing horse owners will refuse to allow their horses race on a track which is too hard because of the negative effect racing on the hard ground can have on the animal's muscles and bones. Of the animal arenas, horse race track surfaces have been the most widely evaluated and criticized.

Animal running surfaces are conventionally formed by creating a very flat, hard subbase layer, such as compacted clay or concrete, covered by a base layer which is typically between 4–10 inches thick and may include an additional "cushion" layer or layer on top of the base layer which is typically between 2–4 inches thick. The base layer, and cushion layer if one is used, comprise the running surface layer. The running surface is conventionally sand or may include sand and vegetation (i.e. turf). Often, water activated binders such as clay and silt are also added to the sand of the running surface to provide some support in the sand and reduce the risk of the sand washing away. In preparation for use, animal running surfaces are periodically disced, plowed or graded to provide an even, smooth surface throughout the entire running surface and to loosen any compacted portions of the running surface.

The general intent with an animal running surface is to provide a surface firm enough to support the animal running thereon, yet not so firm as to injure the animal's bones or muscles. Using horse racing as an example, when a horse runs across a track surface, if the horse hoof does not make any impression or only a small impression, the surface is considered too hard. While a hard surface does allow the horse to run faster, horse physiologists believe running on hard surfaces damages the horse. On the contrary, if the surface is too soft such that when the horse runs across the track surface a deep impression is left, the surface is considered too soft. While the soft surface will not necessarily damage the horse's physiology, it does cause the horse to run more slowly and tire more quickly. If the horse is not accustomed to running on a soft track, an ordinarily fast horse will lose the race. It is therefore desirable to have consistent horse track racing surface conditions.

However, different climates and sand and base materials can have significantly different effects on a running surface. When an animal running surface is formed, geographically local materials are generally used to create the running surface. As a result, each locality has a running surface made of different materials which may affect the hardness of the surface. Climate may also affect the amount of moisture a running surface receives, how quickly the running surface dissipates moisture to the air, the relative temperatures the surface will be exposed to, and numerous other factors. It is, therefore, difficult to create consistent running surface conditions among different geographic localities. For animals which compete nationally or internationally, consistent running surface conditions would significantly improve consistency of performance and the health of the animal.

In attempts to create soft, supportive, consistent surfaces, those skilled in the art of designing and maintaining animal running surfaces have applied a number of organic and synthetic materials for use as amendments or surface treatments to soften and support the soil. Although use of organic and synthetic amendments to the soil of animal running surfaces may help to retain and regulate moisture in the surface and provide a resilient surface, organic materials decay, often create an odor, cause additional dust and need to be replaced relatively frequently. Furthermore, there are environmental concerns with synthetic materials such as rubber and synthetic fibers which eventually break down and may pollute the environment. Many of the considerations necessary for animal competition arena surfaces are different from those of human sporting fields because of the significantly larger weight of many of the animals used for animal competition. Horses, for example, weigh significantly more than most human athletes. The increased weight of the animal requires a much more durable and supportive material than would be necessary for a human.

Accordingly, there is a need in the art for an animal arena surface which is natural, durable, and supportive for the animal, but not hard enough to cause physiological damage. Moisture retention and regulation as well as minimization of dust are also concerns.

DISCLOSURE OF THE INVENTION

The present invention relates to a natural, calcined granular clay soil amendment for use in animal arenas and other animal running surfaces. The soil amendment granules of embodiments of the invention are hard, extremely porous, and generally angular by nature, and when mixed with soil of an animal arena, provide a soft, supportive surface for animals to run on and maintain a moisture equilibrium for the soil for an extended time. Generally, the present invention provides soil amendment composition comprising granules having calcium bentonite clay, illite clay, and/or kaolinite clay. A method of fabricating the granules of the invention may generally include the steps of: forming or excavating a clay having a mixture of calcium bentonite clay, illite clay, and/or kaolinite clay; crushing the clay into a granule composition; screening the composition; kilning the composition; and washing the composition.

As will be made clear, important advantages of the soil amendment granules in accordance embodiments of the invention relate to angularity, hardness and absorbency. In various embodiments of the invention, calcium bentonite, illite, and/or kaolinite are combined in ratios (along with moisture and atmospheric gases), crushed in a manner to obtain sufficient angularity, and flash kilned to provide granules having generally angular structures and high hardness coupled with high absorbency. Neither minimum hardness nor minimum absorbency may be sacrificed if the soil amendment is to effectively support animals running on the arena surface and maintain an extended equilibrium for moisture in the surface. Depending upon the weight of the animal, inadequate hardness will result in the amendment granules breaking down to powder/dust, or losing their angularity as the surface supports the animals. Without the designed absorbency, wicking and moisture storage properties will not be maximized and the soil amendment granules will not function to quickly absorb moisture placed on the surface for time-extended release of the moisture to surrounding soil.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Embodiments of the present invention relate to a soil amendment for an animal arena surface which comprises highly absorbent and durable calcined clay granules. As used herein, the term "soil" is intended to include all varieties of materials which are used for a running surface layer of an animal arena. While animal arena running surface layers conventionally include standard dirt or sand, mixtures of dirt or sand with other constituents such as organic materials, synthetic materials or other minerals are also intended to be included within the definition of "soil."

Figure 1:
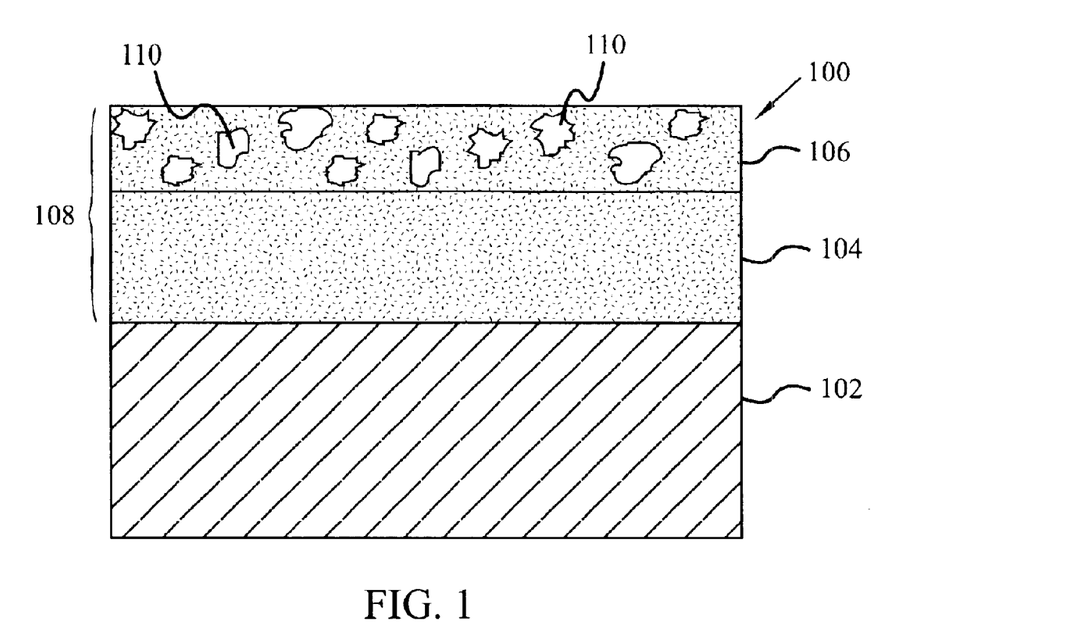
FIG. 1 is a cross-sectional view of an animal arena surface comprising amendment granules within the cushion of the running surface.

As illustrated in FIG. 1, a cross-sectional view of an animal arena surface 100 includes a subbase layer 102, a base layer 104 and a cushion layer 106. The cushion layer 106 and the base layer 104 form the running surface layer 108 for the arena surface 100. For the animal arena surface 100 of FIG. 1, the cushion layer 106 includes generally angular calcined clay granules 110 to increase the absorbancy of the amended soil composition, decrease the density, and provide support for animals on the arena surface 100. The respective thicknesses of the subbase, base and cushion layers 102, 104 and 106 are typical of conventional surfaces known in the art and one of ordinary skill in the art will be readily able to determine an appropriate thickness for a particular surface given the disclosure provided herein. By way of example only, and not as a limitation, the subbase layer may comprise compacted clay, concrete or other material which can be made very hard and relatively flat, the base layer may comprise dirt or sand and be between approximately 4–10 inches thick, and the cushion layer may similarly comprise dirt or sand and other amendments and be between approximately 2–4 inches thick.

Figure 2:
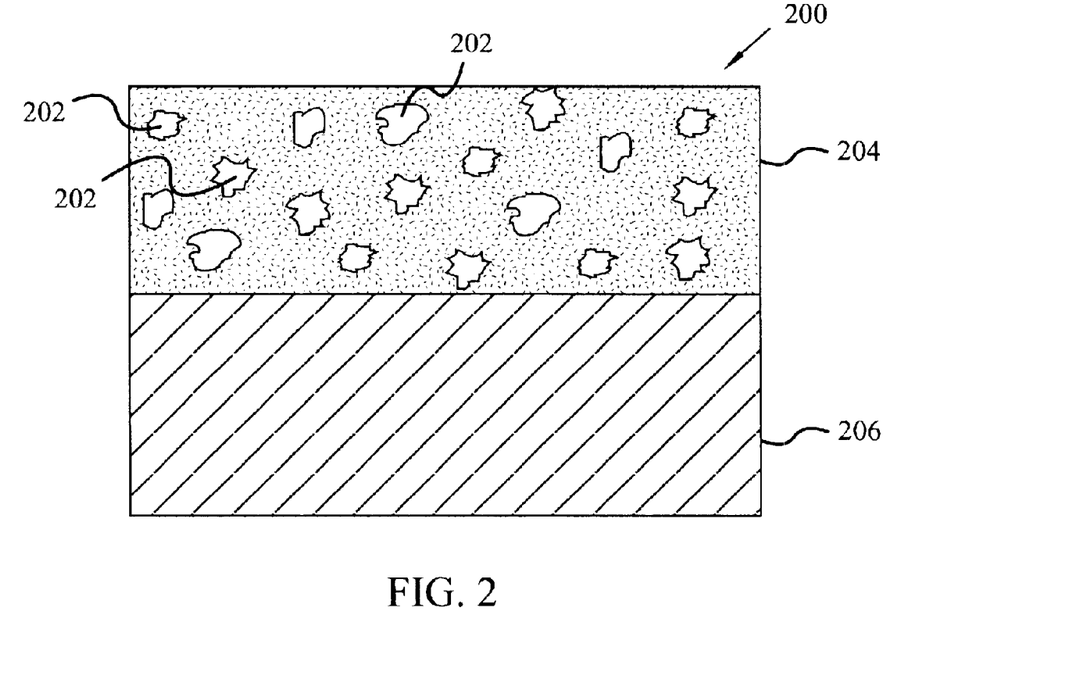
FIG. 2 is a cross-sectional view of an animal arena surface comprising amendment granules throughout the running surface.

FIG. 2 illustrates an embodiment of the invention where granules 202 of a granular soil amendment for use in an animal arena surface 200 are included throughout the running surface layer 204 above the subbase layer 206. Depending upon the climate conditions, soil materials used, use for the arena surface, and other factors described in more detail herein, the granules 202 may be desirable throughout all or only a portion of the running surface layer 204.

Because the soil amendment comprises hardened granules, the granules will not pack or permanently bind together with the other granules, thereby creating a loose surface material. Nevertheless, when a pressure is exerted upon the granules, the angular surfaces of the granules tend to interlock or create greater surface friction against adjacent soil or granules providing support against the force. Conventional arena surface material, if it includes anything at all, includes a binding material such as fine clay or silt to help bind the surface materials together when wet to provide a soft yet supportive surface on which an animal may run. This helps the animal run on the top of the surface making impressions in it rather than sinking into the surface with each step. Because these binders are water activated, arena owners often must water down the arena surface between each use to assure consistent conditions for each competition. Also, there is typically a time after the arena surface is watered where too much water exists on the surface and competition must wait. As discussed below, the angularity and absorbency of the granules of embodiments of the present invention help to relieve these problems.

Rounding of angular materials occurs as a consequence of transport in a natural environment by breaking off the angular corners. When angular surfaces contact each other, the forces are concentrated primarily on the corners causing them to interlock or break off. Over time, if the material with the angular surface is not sufficiently hard, the material will naturally become rounded. For example, natural earth materials, such as sand, are typically rounded. As a result, when pressure is applied to a quantity of dry sand, the sand tends to allow the object exerting the pressure to pass into the sand, easily pushing it away. By nature of the granules of the present invention being new and hardened, they maintain their angularity for a long time. Consequently, the angular surfaces of the granules tend to lock together and interlock with the surrounding soil when used as an amendment. As a result, the surface layer containing a soil amendment of the present invention is tighter and more supportive of a ground pressure without the requirement of water activated binders. Embodiments of the invention, however, may include a binder in addition to the granular soil amendment for additional support if necessary.

The angularity of mineral samples is well known in the art and typically includes six classifications of angularity having associated median rho values for roundness: "Very Angular" (0.5), "Angular" (1.5), "Sub-angular" (2.5), "Sub-rounded" (3.5), "Rounded"(4.5), and "Well Rounded" (5.5). Sphericity is also well known and generally categorized by five classifications of sphericity having associated median rho values for sphericity: "Discoidal" (0.5), "Sub-discoidal" (2.5), "Spherical" (4.5), "Sub-Prismoidal" (−2.5), and "Prismoidal" (−0.5). Further information regarding the sphericity and angularity (or roundness) of granular samples may be found on AGI Data Sheet 18.1, *Comparison Chart for*

*Estimating Roundness and Sphericity*, by Maurice C. Powers, Elizabeth City State University, and AGI Data Sheet 18.2, both available through the American Geological Institute headquartered in Alexandria, Va. The angularity and sphericity of a soil amendment granule may have a significant affect upon how that granule relates with its environment and, as a result, the amount of support which will be provided by an amended soil surface when the granules are incorporated therein. Because of the wide variations in soil characteristics, the endless combinations of soil characteristics with amendments having particular angularity and sphericity, and the numerous uses for animal arena soil surfaces, it is impossible to provide examples for every combination. Those of ordinary skill in the art will readily be able to determine the necessary angularity and sphericity based upon the characteristics of the soil, the necessary support needed from the soil, and the use of a particular arena surface. In one particular example, a granular amendment is used having at least Sub-Angular angularity and having any sphericity.

Figure 3:
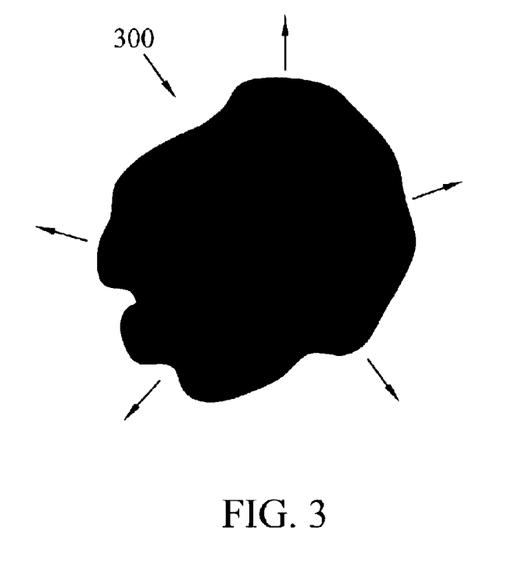
FIGS. 3–6 are front plan views of a hypothetical calcined clay granule fabricated according to an embodiment of the invention illustrating moisture content states during the capture and release over time of moisture.
Figure 4:
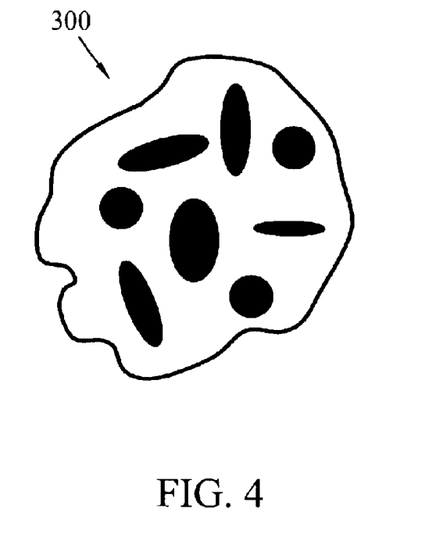
Figure 5:
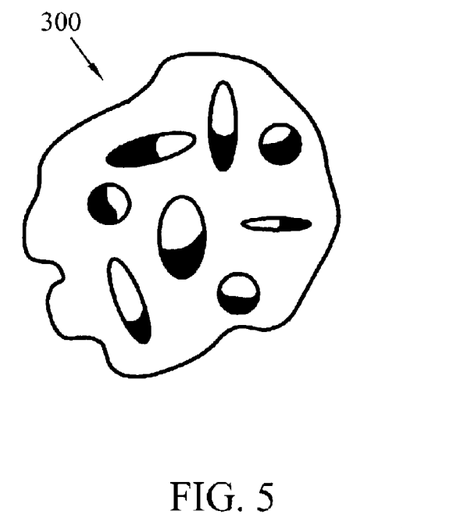
Figure 6:
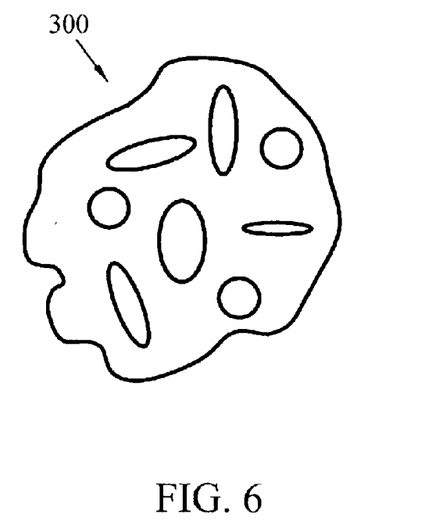

FIGS. 3–6 illustrate moisture content states during the capture and release over time of moisture for a hypothetical granule of a composition of a soil amendment configured according to an embodiment of the invention. In particular, moisture from the soil and environment surrounding the granule is absorbed into the porous microstructures of granule 300 through capillary action so that granule 300 is saturated as illustrated in FIG. 3. Over time, and as illustrated sequentially in FIGS. 4–6, absorbed moisture is gradually dissipated from the surface and porous structures of granule 300 to the soil and environment surrounding granule 300.

The moisture dissipating from the granule 300 is transferred to its environment so that equilibrium is maintained. Sandy soils conventionally have capacity to store moisture on external surface areas until the moisture is either drawn into the atmosphere above the soil, drawn to less moist surrounding soil, or drawn by gravity down to the subbase level and flows away. However, because the sandy soil has no internal granule microstructures o r internal porosity for storing larger amounts of moisture, the maxi mum surface storage capacity of the soil is quickly reached and the moisture quickly dissipates. The granules of embodiments of the present invention have much greater capacity to store moisture within the microstructures than does conventional soil. Additionally, because the microstructures extend into the granules and store much of the moisture, the moisture within the granule microstructures dissipates more slowly than the moisture on the outer-surface of conventional soil. Resultingly, the granules slowly release the moisture to the soil surrounding the granules over time, maintaining an equilibrium of moisture within the amended soil for an extend ed period of time.

Where an extended water retention time is desired (i.e. an animal arena surface), the ideal mixtures of granules of the present invention will be a percentage or fraction of the total soil mixture. The individual granules of the present invention will store and release moisture for longer periods of time if the granules are disseminated throughout the soil. Dissemination of granules of the present invention throughout the soil causes a mulching or insulation effect to limit losses of moisture to the atmosphere. A mixture of soil and granules of the present invention will result in the granules contributing moisture over time to the soil and any associated binders used in the soil (i.e. clay or silt). When sand or sand-like material is used as the soil, the sand is typically formed of rounded quartz with no internal porosity. The lack of internal porosity in quartz sand particles limits moisture transfer to the capillary draw of moisture through the rather convoluted and limited pathway of the shells of adsorbed water existing on the exterior of each of the sand particles. Granules of the present invention have both the adsorbed moisture pathway present for sand particles as well as the more effective, shorter and straighter pathway of interconnected microstructure porosity (absorbed or intragranular moisture).

Figure 7:
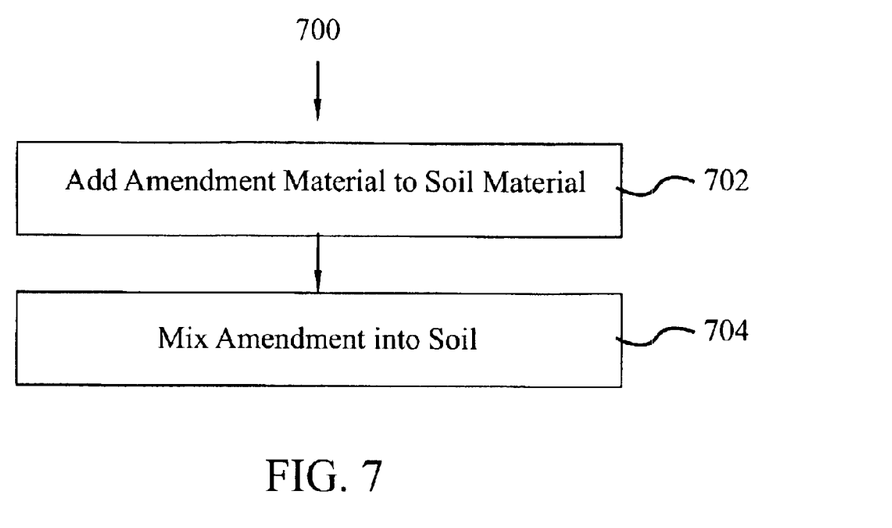
FIG. 7 is a flow diagram of a method of amending an animal arena surface.

FIG. 7 illustrates a method 700 of combining the soil amendment granules into the arena surface soil. The soil amendment granules may be added to the soil material before the soil material is placed in the arena, or may alternatively be added to the soil after the soil is in place on the arena surface (Step 702). The ratio of soil amendment granules to soil required for the conditions of a particular animal arena surface varies widely depending upon the soil materials, geographic climate, and use of the surface. By example, for a surface comprising hard soil material, an excessive amount of binding materials, or where a softer supportive surface is needed, a higher ratio of granules to soil and/or a higher ratio of larger granules may be desirable to provide the amended soil with less density and more free-flowing materials, while maintaining surface support for the animals due to the angularity of the granules. By another example, if the surface is subjected to occasional or frequent heavy rain showers or flooding, a higher concentration of smaller sized granules with high wicking characteristics may be more desirable to allow competition to commence soon after the water floods the surface. Alternatively, if the surface is too soft for the use and needs support, one of ordinary skill in the art, from the principles provided herein, will be able to determine an appropriate mixture of granules and soil to provide more surface support. Furthermore, if the arena already has an acceptable hardness but is unable to adequately control dust conditions or surface support for a sufficient time, an appropriate amount of mid-sized granules may be added to merely improve and regulate the water retention capabilities of the soil.

For most arena surfaces, the necessary ratio of amendment materials to soil will be less than 50%. Use of granule concentrations greater than 50% may have a greater tendency to dry the surrounding soil rather than retain moisture therein, but will also provide even greater surface support. This drying effect is caused by the effective wicking properties of the granules. When the concentration of granules is too high, the moisture may be more quickly drawn directly to and dissipated at the surface of the soil through interacting with adjacent granules' high internal porosity rather than through the soil. If moisture is a problem, however, or significant support is desirable, greater concentrations of granules may be used. More likely, the desired ratio will be between 10% and 40%, and most likely between 10%–30%. However, because the specific requirements for each arena surface and use is different, more specific ratios and site specific mixtures of granule sizes will need to be determined by one of ordinary skill in the art with knowledge of a particular arena and its needs. The disclosures herein are intended to provide enough background and explanation so that one of ordinary skill in the art may make the appropriate determinations based upon the existing conditions of the arena and the desired conditions for the arena surface. Though specific criteria and characteristics for arena surfaces have not yet been standardized in the animal arena industry, in-part due to the wide range of conditions, regional variations in soil components and the unavailability of materials having the capabilities of the present invention, it is anticipated that standards will develop to allow animal arena surfaces to have similar characteristics regardless of geographic location or available materials.

Once the amendment materials have been added to the soil (Step 702), the amendment granules may be mixed into the soil (Step 704). For soil amendment granules mixed into the soil prior to placing the soil onto the arena surface, many conventional techniques are known for mixing granular material into soil to obtain a substantially even distribution of granules throughout the soil. Mixing techniques for adding granular material to soil after it is in place on an arena surface are also well known in the art. For example, the necessary quantity of soil amendment granules could be spread over the surface of the arena and disced or otherwise plowed into the surface. The depth to which a soil amendment material should be mixed into the soil depends, as discussed previously, upon the conditions of the soil, the desired depth of the cushion layer or running surface layer, and the ratio of soil amendment granules to soil desired as compared to the quantity of granules distributed on top of the surface. Embodiments of the present invention may also include different ratios of soil amendment granules to soil at different levels of the animal arena surface.

Figure 8:
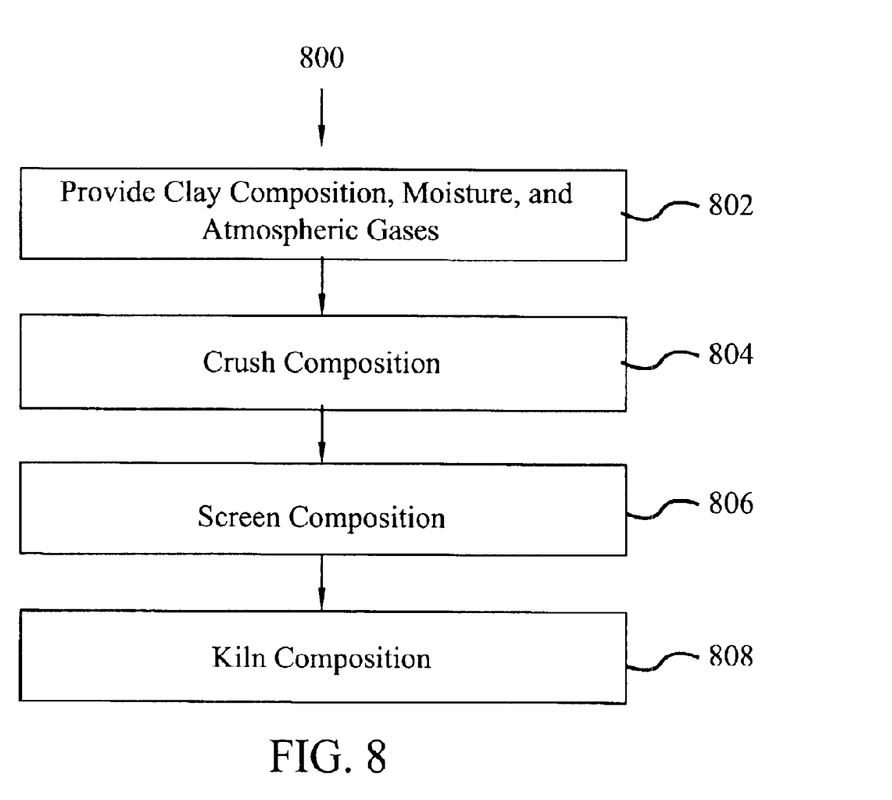
FIG. 8 is a flow diagram of a method of fabricating calcined clay granules for use as an amendment to an animal arena surface.

FIG. 8 illustrates an exemplary fabrication method 800 for forming a highly absorbent granular calcined clay composition in accordance with embodiments of the invention. Generally, and for the exemplary purposes of this disclosure, method 800 may form an animal arena surface amendment composition by: providing a composition comprising granules having calcium bentonite clay, illite clay, and/or kaolinite clay; crushing the composition; screening the composition; and kilning the composition.

Accordingly, step 802 of method 800 is to provide a composition comprising granules having calcium bentonite clay, illite clay, and/or kaolinite clay. Bentonite, which is a montmorillonite or smectite clay, is formed of hydrous magnesium aluminum silicate. A montmorillonite is capable of both absorption and adsorption of water. Absorption is water retention due to porosity. Adsorption is the attraction of liquid molecules to a surface through electrical bonding. Two common forms of bentonite exist, sodium bentonite and calcium bentonite, and they are distinguished by having a preponderance of either sodium or calcium cations. Calcium bentonite is the least swelling of the two bentonite types (when water is introduced), and is also the better absorbent. Calcium bentonite is an acid-activatable clay that may be treated with hydrochloric acid or sulfuric acid to significantly increase its surface area and enhance its absorptive properties.

Illite clays are mica-like clay minerals which have no expansion characteristics upon wetting. Illite clays conventionally have potassium ions locking their crystal lattices in place. Kaolinite is a hydrated aluminum silicate. Kaolinite is typically low in iron and are often white in color. Kaolinite has the ability to withstand high temperatures in firing and is useful for bonding.

The calcium bentonite clay, the illite clay, and the kaolinite clay may be respectively combined in any percentage by weight depending upon the particular needs of an application, and may be verified by X-Ray diffraction techniques well known to those of ordinary skill in the art. In various embodiments of the invention, calcium bentonite, illite, and/or kaolinite are combined in percentages by weight greater than contaminate amounts so that the resulting amendment may function effectively. Contaminate levels in clays are typically less than 2% by weight.

Accordingly, for example, the calcium bentonite clay, the illite clay, and the kaolinite clay may be respectively combined in a percentage by weight of approximately 72%:17%:11% to approximately 15%:29%:56%. Different percentages by weight affect absorbancy and hardness. Comparatively high kaolinite percentage mixes result in materials of moderate absorbency and low hardness with a high tendency for dustiness. Comparatively high illite percentage mixes result in materials of high absorbancy and low hardness with a high tendency for dustiness. Comparatively high calcium bentonite percentage mixes result in materials of moderate absorbancy and high hardness. Thus, a comparatively high calcium bentonite percentage maximizes both absorbency and hardness with lower dustiness. A comparatively low calcium bentonite percentage maximizes absorbancy and is useful in a setting where hardness and dust are less of a concern.

However, in other embodiments of the invention, the composition may comprise granules having calcium bentonite clay and one of kaolin clay and illite clay. Calcium bentonite clay and one of kaolin clay and illite clay may be respectively combined in any percentage by weight depending upon the particular application. Accordingly, for example, the calcium bentonite clay and one of the illite clay and the kaolinite clay may be respectively combined in a percentage by weight of approximately 85%:15% to approximately 15%:85%. Again, different percentages by weight affect absorbancy and hardness and may be used in various applications depending upon the weight of the animals using the arena and the rigor with which they will use it.

In still other embodiments of the invention, the composition may comprise granules having calcium bentonite clay, illite clay, kaolinite clay, chlorite clay, and other minor constituents, such as quartz, calcite, K-feldspar, hematite, plagioclase, and unaccounted materials. Accordingly, for example, the calcium bentonite clay, the illite clay, the kaolinite clay, the chlorite clay, the quartz, the calcite, the K-feldspar, the hematite, the plagioclase, and the unaccounted materials may be respectively combined in a percentage by weight of approximately 48%:11%:7%:0%:10%:4%:2%:12%:3%:3% to approximately 8%:12%:27%:5%:29%:5%:4%:0%:7%:3%.

In step 102, the calcium bentonite clay, the illite clay, and the kaolinite clay may be excavated and then selectively mixed together to form granules of select compositions in accordance with embodiments of the invention. Calcium bentonite may be excavated by surface removal. The raw clay material may then be disced in place, followed by a weathering of clay chunks to effect a breakdown in overall size. Alternatively, the calcium bentonite clay, the illite clay, and the kaolinite clay may be excavated as a naturally occurring mixture of the clay types. Additionally, the granules may be recycled from clay brick, tile, pottery, or other similar products which were formed of clay comprising a mixture of calcium bentonite and at least one of the other two clay types.

Accordingly, step 802 may further include additional steps depending upon whether the calcium bentonite clay, the illite clay, and the kaolinite clay need to be mixed together or not. Whether the mixture of the calcium bentonite clay, the illite clay, and the kaolinite clay is naturally occurring or is formed from the mixing of clay types, step 802 may further include providing moisture and/or atmospheric gas as part of the composition of the invention. Moisture may be in the form of water and/or any other suitable liquid for example. Moisture may be added to swell the clay mixture, providing for increased surface area and porosity. Atmospheric gases may include $O_2$, $N_2$, or any combination thereof for example. Such gases may be entrained or mixed with water to assist in bloating. Depending upon the amount of admixed water and atmospheric gases, the clay mixture may be bloated as much as 500%.

If the various clay types have to be mixed together, then step 802 may further include mixing the calcium bentonite clay, the illite clay, and/or the kaolinite clay together, along with atmospheric gases and/or moisture if included, in a pug mill for example. Pug mills are used to blend clay to a moist, workable consistency. The presence of admixed moisture and atmospheric gases, if any, is maximized while still maintaining a solid consistency. The composition of the invention may then be shredded. Shredding reduces the lump clay in size and may be accomplished by a disintegrator. The composition may then be desiccated. This may include drying the composition using a propane-fired, rotary dryer, fluid bed dryer, or vibrating grate dryer. Mixing, shredding, and desiccation techniques used in clay processing are well known to those of ordinary skill in the art.

Step 804 of method 800 is to crush the clay mixture to form granules of the composition. Crushing may occur in stages. For example, primary crushing may reduce clay mixture size from as much as a cubic foot to a few cubic centimeters and may be accomplished using jaw, gyratory, or hammermill crushers. Secondary crushing may reduce the clay mixture further and may be accomplished by rotating pan crushers, cone crushers, tooth roll crushers, smooth roll crushers, and hammer mills. Crushing techniques used to crush clays are well known to those of ordinary skill in the art.

Turning to step 806 of method 800, the granules of the soil amendment composition may be screened in order to sort out granules into various size groupings. Screening may be accomplished, for example, by using screens that are mechanically or electromagnetically vibrated. The granules may be screened any number of times to remove oversized and undersized components including as much dust removal as possible without water. Granular size and distribution for the granules useful herein are conveniently measured by screening a sample of the composition and determining the size and amount of material passed or retained by each of the differently sized mesh openings of the screens. For example, a mesh opening of 4# is equivalent to 4.75 $mm^2$, a mesh opening of 8# is equivalent to 2.36 $mm^2$, a mesh opening of 20# is equivalent to 0.92 $mm^2$, etc. Screening techniques and mesh sizes used to sort clay granules are well known to those of ordinary skill in the art.

Any size or size range of granules of the soil amendment composition of the invention may be produced. A soil amendment having a given range of granule sizes may also differ in the distribution or proportion of granules having each particular size. Thus, the soil amendment composition manufactured according to embodiments of the invention may be a mixture of differently sized granules, which may be more moisture absorbent or load supportive than when all granules are the same size. However, the soil amendment may be a mixture of similarly sized granules as well.

Accordingly, mixtures of different granule sizes and particle shapes allow for higher absorbency and different animal support characteristics (e.g. animal ground pressure support). For example, granule mixes with increased amounts of material sized in the 14–50 mesh range to maximize absorbency will be of advantage to soil amendments in arenas requiring very high wicking capacities along with a reduced concern for a breakdown of product (attrition losses). While inclusion of fines (40 mesh granules or smaller) actually helps to increase the wicking capacity of a soil amendment composition, fines may also pose a risk to some animals if feeding occurs on the arena surface (the risk of sand colic: sand ingestion and compaction in bowels).

In one embodiment of the invention, the granules of the soil amendment composition may comprise a mixture of granule sizes from 4–14 mesh formed from approximately 8–14 mesh granules and approximately 4–8 mesh granules combined in a respective percentage by weight of approximately 60%:40%. In another embodiment of the invention, the granules of the soil amendment composition may comprise a mixture of granule sizes from 4–20 mesh formed from approximately 8–20 mesh granules and approximately 4–8 mesh granules combined in a respective percentage by weight of approximately 50%:50%.

In still another embodiment of the invention, the granules of the soil amendment composition may comprise a mixture of granule sizes from 4–50 mesh formed from approximately 20–50 mesh granules and approximately 4–20 mesh granules combined in a respective percentage by weight of approximately 50%:50%. In yet another embodiment of the invention, the granules of the soil amendment composition may comprise a mixture of granule sizes from 8–20 mesh formed from approximately 14–20 mesh granules and approximately 8–14 mesh granules combined in a respective percentage by weight of approximately 50%:50%. In one other embodiment of the invention, the granules of the soil amendment composition may comprise a mixture of granule sizes from 8–50 mesh formed from approximately 20–50 mesh granules and approximately 8–20 mesh granules combined in a respective percentage by weight of approximately 50%:50%. The overall effect of adding soil amendment granules to the site specific arena soils will be determined by the interaction of the size and shape of the arena surface materials and the size and shape of amending granules. A narrow range of amending granules (i.e. 8–12 mesh as opposed to 8–30 mesh) would be less supportive and would retain internal intra-granular moisture for longer periods of time.

Those of ordinary skill in the art will understand the benefits and trade-off of hardness and absorbency resulting from various mixtures of mesh sizes and will be able to readily select an appropriate combination and distribution of mesh sizes for a particular application from the disclosure provided herein.

Step 808 of method 800 is to kiln the composition. Kilning may occur in stages, namely evaporation of free water, dehydration, oxidation/reduction, and vitrification, and may be accomplished using a propane-fired, stainless steel, rotary kiln or other kilns as known in the art. In addition, kilning may comprise either flash kilning or long term kilning.

Flash kilning may be carried out at a temperature of approximately 1,800° F. to approximately 2,000° F. for a time period of approximately 5–30 minutes depending upon the percentage of calcium bentonite in the mix for example. Other samples may need to be kilned for a much longer term (i.e. up to 20 days). In a rotary kiln, there is a reduced possibility of granules insulating other granules from firing as granules are continuously rolling in the rotating kiln tube so that they come in contact with the elevated temperature multiple times per minute. If granules are left in the kiln for to long, the clay will vitrify completely or melt into a glass-like material and be of no use as an absorbent. For recycled products, some processing, such as kilning, may be needed but will necessarily be determined in relation to the condition of the recycled product. Kilning techniques for clay are well known to those of ordinary skill in the art The angularity or lack of angularity of the granules may be enhanced by the dryness of the clay and the crushing method used. While the clay granules are still unkilned, the corners could be removed or reduced by different crushing methods or mechanically induced attrition. Those of ordinary skill in the art will understand the methods of increasing and reducing the angularity of the granules for the site specific needs of a particular arena application.

Step 808 of kilning the composition may further comprise controlling $O_2$ input into the kiln during kilning to create an oxidizing or reducing atmosphere. This may be accomplished in a rotary kiln by reducing the amount of $O_2$ for the flame. A reducing atmosphere comprises an atmosphere with an excess of C, CO or $CO_2$. An oxidizing atmosphere comprises an atmosphere with an excess of $O_2$. Different oxidizing or reducing atmospheres may result in a differently fluxed granule composition of the invention depending upon color and strength/hardness requirements. In an oxidizing atmosphere, naturally occurring iron oxide minerals in the clays are oxidized to a reddish-brown color and help the clay mixture to achieve partial vitrification (the hardening, tightening and finally fusion or melting of the various clay components of the mixture) with the iron oxide acting as a flux (lowers the melting point of the mixture). Thus, partial vitrification occurs in the granules having the clay mixture but to a degree consistent with maintaining a high degree of porosity (absorbency) and a high hardness. In a reducing atmosphere, naturally occurring iron oxide minerals in the clays are not oxidized to a reddish-brown color and the composition has a gray coloration.

Figure 9:
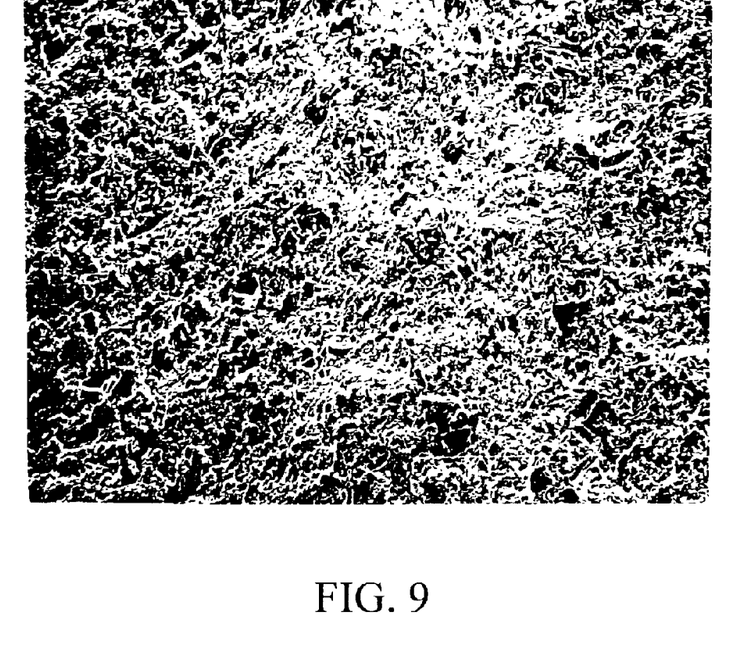
FIG. 9 is a SEM photomicrograph at 280× magnification illustrating an overall surface texture of a calcined clay granule fabricated according to the method of FIG. 8.
Figure 10:
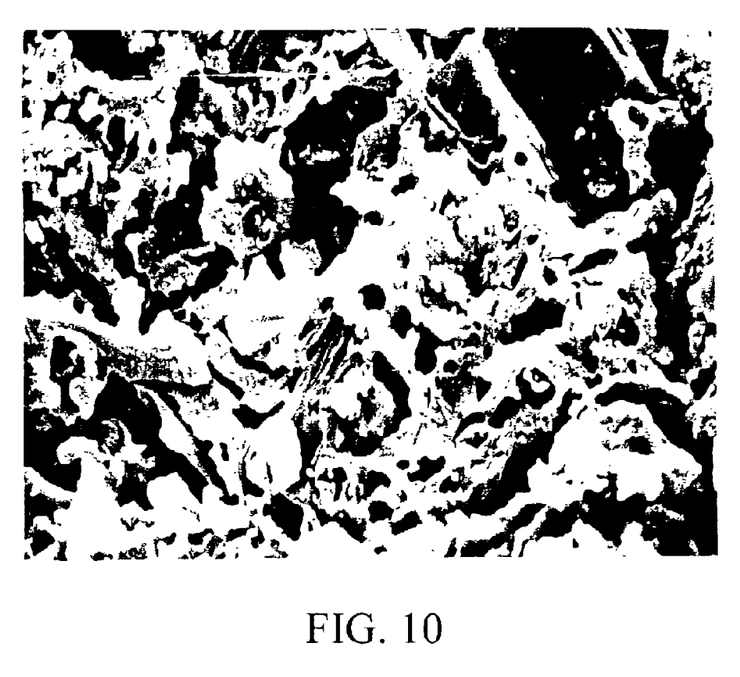
FIG. 10 is a SEM photomicrograph at 3,000× magnification illustrating micropores, microchannels, and their interconnections in the granule of FIG. 9.

Step 808 of kilning the composition may further comprise forming interconnecting micropores and microchannels in each of the granules for providing extensive permeability and porosity (absorbency). Accordingly, and for the exemplary purposes of this disclosure, FIGS. 9 and 10 depict a portion of a granule of soil amendment composition of the invention at different magnifications. FIG. 9 illustrates an overall surface texture of the granule, while FIG. 10 illustrates micropores, voids, and microchannels, and their interconnections in the granule. Micropores, voids, and microchannels may have any dimensions and may be measured in nanometers (nm), also known as millimicrons. For example, microchannels may range in opening size from approximately 100 nm to approximately 600 nm. Crevice-like voids may have opening sizes of up to approximately 80 nm. Each of the micropores may have an opening of approximately 0.1 nm to approximately 30 nm. If the micropores, voids, and microchannels were of only one size, they would have specific functions and not wide ranging applications to a variety of moistures, moisture retention and storage, and moisture time release.

In one particular embodiment of the invention, the soil amendment composition comprising the sized granules having calcium bentonite clay, illite clay, and kaolinite clay is flash kilned to bloat and/or expand the granules as admixed moisture and atmospheric gases are released. This release of moisture and gases forms a porous microstructure in the granules imparting to them a high level of micro and macro porosity. In another embodiment of the invention, the soil amendment granules may be formed with enhanced porous microstructure, similar to the structures depicted in the granule portion of FIGS. 9 and 10. Enhanced porous microstructure leads to enhanced absorbency and may be accomplished by admixtures of sacrificial materials, such as organic lints, organic dusts, and/or gas forming minerals to increase the extent and shapes of microstructures of the interconnecting micropores and microchannels in each of the granules. Organic tints from fibrous plants, organic dusts (e.g. composts), and gas forming minerals (e.g. coal dust, lignite dust, peat dust, sulfur containing compounds such as $FeS_4$ or Pyrite, etc.) are ground to a very fine size (e.g. 100 mesh or more) and pugmilled into the composition. The composition is then kilned to burn out these sacrificial materials. The sacrificial materials may be added up to approximately 50% by volume of the composition.

High absorbency is achieved as a result of the foregoing porosity enhancing techniques and the resulting microporosity and macroporosity of the granules. The combination of external surface area and internal porosity surface areas lead to very large lab-calculated surface areas. In some embodiments of the invention, the soil amendment composition may have a surface area of approximately 2,000,000 $ft^2/ft^3$ to approximately 40,000,000 $ft^2/ft^3$. In other embodiments, the soil amendment composition may have a surface area of up to approximately 75,000,000 $ft^2/ft^3$ if acid activated or bloated by kilning. Approximate examples of surface areas of gravel, sand, diatomaceous earth, and a soil amendment composition of the invention are illustrated in the following table for comparison:

| Gravel | Sand | Diatomaceous Earth | Soil Amendment of the Invention |
|---|---|---|---|
| 600 $ft^2/ft^3$ | 1500 $ft^2/ft^3$ | 200,000 $ft^2/ft^3$ | 2,000,000–75,000,000 $ft^2/ft^3$ |

Accordingly, a soil amendment composition in accordance with embodiments of the invention may have superior absorbency. As just described, soil amendment composition granules may be extremely porous. This microporosity and macroporosity makes the granules highly absorbent and gives them very large surface areas, thereby providing increased moisture and liquid storage potential and dissipation. The micropores and microchannels of the granules function as reservoirs for liquid, moisture, and even some of the ammonia from animal waste. As such, the soil amendment compositions described herein have the increased ability to capture and then time-release moisture. The moisture may be forced into a closed end space in a granule's porous microstructure and time is required for removal by dissipation.

Laboratory tests of soil amendment material configured according to embodiments of the present invention exhibit favorable absorbancy and wicking capabilities. An absorbency rate is a measure of the speed of movement of water (water front) as it is absorbed into a material. A wicking test was performed on two samples of the soil amendment composition by allowing water from a water bath to climb the soil amendment composition in a standard, plastic, 52 mm inside diameter, 500 ml, graduated PolyLab™ cylinder, or column as is known in the art. Water enters the column through perforations in the base of the column. The perforations are of sufficient size and number to allow water from the bath to enter in the column, but not allow material to fall into the water bath. The wetting front in the material rises over time and is then plotted as distance versus time. A first soil amendment sample having granule sizes ranging from between 8 mesh to 20 mesh had an absorbancy rate of approximately 90 milliliters or more within 10 minutes. A second soil amendment sample having granule sizes ranging from between 20 mesh to 50 mesh had an absorbancy rate of approximately 105 milliliters or more within 90 seconds. Compare these results with the same test performed on two samples of a conventional clinotillite zeolite high absorbency granules which indicated that a first sample having mesh sizes between 8 mesh and 20 mesh had an absorbancy rate of only 80 milliliters within 10 minutes and a second sample having mesh sizes between 20 mesh and 50 mesh had an absorbancy rate of only 95 milliliters within 90 seconds.

The absorption capacity of soil amendment granules of embodiments of the invention is also a strong benefit. In some embodiments of the invention, the soil amendment composition may have an absorption capacity of approximately 0.5 ml/g to approximately 2.5 ml/g. In other embodiments of the invention, the soil amendment composition may have an absorption capacity of approximately 1.4 ml/g to approximately 1.9 ml/g. These absorption capacities are important because they illustrate the ability of soil amendment composition embodiments of the invention to reduce the likelihood of moisture build-up becoming a problem in an arena. For example, in a test using a 12' by 12' by 4" quantity of soil amendment granules, the soil amendment had a total intergranular water storage of 142 gallons. While use of the soil amendment granules will be significantly less concentrated when mixed with soil, this test illustrates the high capacity of the granules to absorb and store moisture for dissipation over time.

Step 808 of kilning the composition may further harden the soil amendment composition. Granules of soil amendment in accordance with embodiments of the invention may be sufficiently hard with no tendency to break down in use (very high resistance to crushing/powdering under an animal's weight). With more moisture content in the soil and through using hard granules, there is less dust produced when the animals kick up the arena surface materials. Hardness is primarily a function of porosity. The more open the internal granule structure the lower the hardness. Harder soil amendment materials are more durable and have less of a tendency to degrade than softer materials (such as synthetic, organic or softer mineral materials).

The Los Angeles (LA) Abrasion test, or American Society for Testing and Materials (ASTM) C-131 test, is a standard method used to measure the hardness or degradation potential of clay. Results are obtained through a combination of actions including abrasion, attrition, impact, and grinding in a rotating steel drum. Approximately 30 grams of kilned clay granules (soil amendment) is placed in a rotating steel drum with five steel balls for 500 revolutions. After the prescribed number of revolutions, the contents are removed and the soil amendment is sieved to measure the degradation as percent loss. Smaller, more appropriate screens are used to sieve the soil amendment composition granules as opposed to course, aggregate screens.

In some embodiments of the invention, the soil amendment composition granules have an LA Abrasion hardness value of approximately 3 to approximately 60 (i.e., a maximum allowable loss of approximately 3% to approximately 60%). In other embodiments of the invention, the soil amendment composition granules have an LA Abrasion hardness value of approximately 20 to approximately 35. For example, in one specific test of a soil amendment composition embodiment of the invention derived from a recycled clay product comprising a mixture of calcium bentonite clay, illite clay, and kaolinite clay, granules have an LA Abrasion hardness value of approximately 31 to approximately 32.

Another testing method employed in the art is a sodium sulfate soundness test (ASTM C-88) which tests the chemical attrition of a sample based upon a weight percent loss of the total sample tested. In embodiments of the invention, the soil amendment composition granules have a sodium sulfate soundness test of approximately 10% or less. In other embodiments of the invention, the soil amendment composition granules have a sodium sulfate soundess test of approximately 5% or less. For example, in one specific test of a soil amendment composition embodiment of the invention, sample yielded a sodium sulfate soundness test loss of only between approximately 2% and 3%. Lower chemical attrition values indicate less susceptibility to the chemical effects of the soil and greater ability to maintain absorptive and hardness properties when exposed to the environment.

An optional step of method 800 is to wash the composition. Washing may be accomplished by any technique known in the art and serves to remove dusts and fine materials remaining after previous processing. For example, washing may be accomplished on vibrating screens with a high-pressure water spray.

Another optional step of method 800 is to add to the soil amendment, in accordance with embodiments of the invention any perfumes, water-soluble zinc salts, deodorants, odor absorbents, anti-microbial agents, disinfectants, colorants, pesticides and/or any combination thereof, in an amount sufficient to perform their intended functions substantially without decreasing hardness and absorbency. Those of ordinary skill in the art will understand the benefits from adding any combination of these materials and will be able to readily select an appropriate combination and distribution for a particular application.

Thus, soil amendments in accordance with embodiments of the invention may be formed through the exemplary fabrication process 800 described above. Accordingly, a soil amendment composition of the invention generally comprises granules having calcium bentonite clay, illite clay, and/or kaolinite clay. The granules may have high hardness coupled with high absorbency, thereby rendering the soil amendment materials long lasting and durable, dust free, easy to maintain, and relatively inexpensive in contrast to many synthetic soil amendments.

The soil amendment composition of the invention may be manufactured to produce a product with a lower unit density than conventional products. Particularly, the soil amendment composition's density (approximately 20–70 lbs/ft$^3$ depending upon the percentage of fines and kilning) is lighter than sand or gravel (125 lbs/ft$^3$). This lower density caused by the designed porosity of the granules may also impart to the soil amendment composition a lower thermal mass. A lower thermal mass equates to a cooler product when compared to heavier natural ground surfaces (i.e., sands and gravels) because of the heat loss mechanism provided by each granule's high surface area. When mixed with natural ground surfaces as an amendment, this will also lower the overall thermal mass of the arena surface. In some embodiments of the invention, the soil amendment composition may be manufactured in lower or higher density varieties to accomplish different end results (e.g. increased absorbency, lowered thermal mass, and reduced resistance to attrition). For example, a lower density is advantageous when hardness is not a concern or for geographic shipping.

Because the soil amendment compositions of the present invention are resistant to degradation, replacement of the arena surface may not be necessary. Replacement of arena surfaces due to expired or degraded surface amendment materials is expensive.

The following example illustrates an exemplary fabrication process, analysis, and use of the present invention.

EXAMPLE

The manufacturing process of a soil amendment composition embodiment of the invention for use in a horse competition arena begins with excavation of the appropriate raw clay types. Once the clay types are excavated, the calcium bentonite, illite, kaolinite, and optionally other minor constituents are introduced into a pugmill with water and mixed to a homogenized composition.

The homogenized mixture is then shredded in a soil shredder to reduce the large clay pieces to more easily managed, smaller pieces. Next, the clay chunks are dried at a temperature of approximately 800° F. in a propane-fired, rotary dryer for a duration of approximately 5 minutes. Granules are then created by using the combination of a roll crusher and a hammermill, and associated dust collection is accomplished by a wetscrubber/baghouse combination vented from dust production points. Following their creation, granules are screened on a dry vibrating screen for sizing into desired size ranges. Specific mesh sizes currently used for various purposes as discussed previously herein include: 4 mesh to 20 mesh; 8 mesh to 20 mesh; 20 mesh to 30 mesh; 20 mesh to 50 mesh; and 30 mesh to 50 mesh.

Granules to be fired are then introduced into a propane-fired, stainless steel, rotary kiln where they are flash kilned at a temperature of 2,000° F. for five minutes. Next, the hot granules are dropped into a stock pile for cooling. After the granules have cooled, they are washed with water on a wet vibrating screen equipped with high pressure wash nozzles. Wet, washed material is then transported by conveyor to a dewatering stock pile. Several days is required for the entire stockpile to dewater (depending upon the size of the pile). Finally, the soil amendment is packaged into one ton sacks or 50 lb. bags for transportation or bulk transportation depending upon the particular use. For amending the entire surface of a rodeo arena or race track, bulk transportation is likely.

Throughout this fabrication process, quality control is accomplished by lab testing batches of the soil amendment composition embodiment of the invention further for chemical analysis, kilning, hardness, and absorbancy, among other characteristics. Thus, for example, the composition for use as a soil composition may comprise a chemical analysis approximately as follows:

| Component | Approximate Percentage (%) of Weight |
|---|---|
| Calcium Bentonite | 48–8 |
| Illite | 11–12 |
| Kaolinite | 7–27 |
| Chlorite | 0–5 |
| Quartz | 10–29 |
| Calcite | 4–5 |
| K-Feldspar | 2–4 |
| Hematite | 12–0 |
| Plagioclase | 3–7 |
| Unaccounted Mat. | 3–3 |

Additionally, the soil amendment composition is manufactured to produce a horse arena soil amendment with: a density of approximately 20–70 lbs/ft$^3$; a surface area of approximately 20,000,000–60,000,000 ft$^2$/ft$^3$; an absorption capacity of approximately 0.8–1.4 ml/g; absorption rate greater than approximately 100 milliliters within a first hour; an LA Abrasion hardness value of approximately 20–30; and a sodium sulfate soundess test weight percent loss of between approximately 2%–10%.

Describing a use of the soil amendment composition embodiment of the invention further, the soil amendment may be mixed into the running surface materials of an arena such as a rodeo arena or race track in a ratio of between 15%–30% compared to the soil materials. Mixing the soil amendment with the soil may be accomplished prior to placing the soil on the arena surface, may be accomplished by discing the amendment into the soil after it is place, or by any other method known in the art. One particular advantage of the hardness of the soil amendment material of embodiments of the present invention is that initial or repeated discing or other mixing methods will not significantly degrade the soil amendment unlike other synthetic, organic or even mineral soil amendments. In use, the soil amendment composition intermixed with the soil will quickly absorb moisture from its surroundings and release the moisture back to the surroundings over time, maintaining and regulating the moisture in the arena surface significantly better than soil without the amendments. This significantly reduces the likelihood of mud or puddles forming on an arena surface, and also significantly reduces the frequency with which an arena surface needs to be watered down for dust control. Use of a granular amendment reduces the frequency with which the arena surface needs to be disced to break up compaction from the weight of the animals.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, it will be understood by those of ordinary skill in the art that while many of the examples provided herein use horse tracks and rodeo arenas to illustrate use of the invention, the principles of the invention are not limited in application to uses relating only to horses. Rather, any description relating to arena surfaces for horses is for the exemplary purposes of this disclosure and those of ordinary skill in the art will understand that the invention may be used in a variety of applications with similar results for a variety of animal arena surfaces.

What is claimed is:

1. An animal competition arena surface comprising:
    a subbase layer; and
    a running surface layer located above the subbase layer and comprising calcined clay granules having at least 3% by weight of calcium bentonite clay and at least 3% by weight of at least one of illite clay and kaolinite clay.

2. The animal arena surface of claim 1, wherein the running surface layer comprises at least 10% by weight of the calcined clay granules.

3. The animal arena surface of claim 1, wherein the calcium bentonite clay and the one of the illite clay and the kaolinite clay are respectively combined in a percentage by weight of approximately 85%:15% to approximately 15%:85%.

4. The animal arena surface of claim 1, wherein the calcined clay granules have an LA Abrasion hardness value of approximately 3 to approximately 60.

5. The animal arena surface of claim 4, wherein the calcined clay granules have an LA Abrasion hardness value of approximately 20 to approximately 35.

6. The animal arena surface of claim 1, wherein the calcined clay granules have an absorption capacity of approximately 0.5 ml/g to approximately 2.5 ml/g.

7. The animal arena surface of claim 6, wherein the calcined clay granules have an absorption capacity of approximately 1.4 ml/g to approximately 1.9 ml/g.

8. The animal arena surface of claim 1, wherein the calcined clay granules have an absorption rate in a 52 mm diameter column of approximately 90 milliliters or more within 10 minutes.

9. The animal arena surface of claim 1, wherein the calcined clay granules have an absorption rate in a 52 mm diameter column of approximately 70 milliliters or more within 1 minute.

10. The animal arena surface of claim 1, wherein the calcined clay granules have a surface area of approximately 2,000,000 $ft^2/ft^3$ to approximately 75,000,000 $ft^2/ft^3$.

11. The animal arena surface of claim 10, wherein the calcined clay granules have a surface area of approximately 20,000,000 $ft^2/ft^3$ to approximately 40,000,000 $ft^2/ft^3$.

12. The animal arena surface of claim 1, wherein at least a portion of the granules each have interconnecting micropores, microchannels, and voids for providing permeability and porosity.

13. The animal arena surface of claim 12, wherein at least a portion of the micropores have an opening length of approximately 0.1 nm to approximately 30 nm, wherein each of the microchannels has an opening length of approximately 100 nm to approximately 600 nm, and wherein each of the voids has an opening length of approximately 30 nm to approximately 80 nm.

14. The animal arena surface of claim 1, wherein the granules further comprise a mixture of granules sized from approximately 4 mesh to approximately 14 mesh.

15. The animal arena surface of claim 14, wherein the mixture of granules is formed from a combination of granules sized from approximately 8 mesh to approximately 14 mesh and granules sized from approximately 4 mesh to approximately 8 mesh in a percentage by weight of approximately 60%:40%.

16. The animal arena surface of claim 1, wherein the granules further comprise a mixture of granules sized from approximately 4 mesh to approximately 20 mesh.

17. The animal arena surface of claim 16, wherein the mixture of granules is formed from a combination of granules sized from approximately 8 mesh to approximately 20 mesh and granules sized from approximately 4 mesh to approximately 8 mesh in a percentage by weight of approximately 50%:50%.

18. The animal arena surface of claim 1, wherein the granules further comprise a mixture of granules sized from approximately 4 mesh to approximately 50 mesh.

19. The animal arena surface of claim 18, wherein the mixture of granules is formed from a combination of granules sized from approximately 20 mesh to approximately 50 mesh and granules sized from approximately 4 mesh to approximately 20 mesh in a percentage by weight of approximately 50%:50%.

20. The animal arena surface of claim 1, wherein the granules further comprise a mixture of granules sized from approximately 8 mesh to approximately 20 mesh.

21. The animal arena surface of claim 20, wherein the mixture of granules is formed from a combination of granules sized from approximately 14 mesh to approximately 20 mesh and granules sized from approximately 8 mesh to approximately 14 mesh in a percentage by weight of approximately 50%:50%.

22. The animal arena surface of claim 1, wherein the granules further comprise a mixture of granules sized from approximately 8 mesh to approximately 50 mesh.

23. The animal arena surface of claim 22, wherein the mixture of granules is formed from a combination of granules sized from approximately 20 mesh to approximately 50 mesh and granules sized from approximately 8 mesh to approximately 20 mesh in a percentage by weight of approximately 50%:50%.

24. The animal arena surface of claim 1, wherein the composition has a density of approximately 20 lbs/$ft^3$ to approximately 70 lbs/$ft^3$.

25. The composition of claim 1, wherein the calcined clay granules have a sodium sulfate soundness test weight percent loss total of approximately 10% or less.

26. The composition of claim 25, wherein the calcined clay granules have a sodium sulfate soundness test weight percent loss total of approximately 5% or less.

27. A soil amendment composition comprising granules each at least having at least 3% by weight of calcium bentonite clay, at least 3% by weight of illite clay, and at least 3% by weight of kaolinite clay.

28. The composition of claim 27; wherein the calcium bentonite clay, the illite clay, and the kaolinite clay are respectively combined in a percentage by weight of approximately 72%:17%:11% to approximately 15%:29%:56%.

29. A soil amendment composition for an animal arena, the composition comprising calcined clay granules having at least 3% by weight of calcium bentonite clay and at least 3% by weight of at least one of illite clay and kaolinite clay.

30. The composition of claim 29, wherein the calcium bentonite clay and the one of the illite clay and the kaolinite clay are respectively combined in a percentage by weight of approximately 85%:15% to approximately 15%:85%.

31. The composition of claim 29, wherein the composition has an LA Abrasion hardness value of approximately 3 to approximately 60.

32. The composition of claim 31, wherein the composition has an LA Abrasion hardness value of approximately 20 to approximately 35.

33. The composition of claim 29, wherein the composition has an absorption capacity of approximately 0.5 ml/g to approximately 2.5 ml/g.

34. The composition of claim 33, wherein the composition has an absorption capacity of approximately 1.4 ml/g to approximately 1.9 ml/g.

35. The composition of claim 29, wherein the composition has an absorption rate in a 52 mm diameter column of approximately 90 milliliters or more within 10 minutes.

36. The composition of claim 29, wherein the composition has an absorption rate in a 52 mm diameter column of approximately 70 milliliters or more within 1 minute.

37. The composition of claim 29, wherein the composition has a surface area of approximately 2,000,000 $ft^2/ft^3$ to approximately 75,000,000 $ft^2/ft^3$.

38. The composition of claim 37, wherein the composition has a surface area of approximately 20,000,000 $ft^2/ft^3$ to approximately 40,000,000 $ft^2/ft^3$.

39. The composition of claim 29, wherein at least a portion of the granules each have interconnecting micropores, microchannels, and voids for providing permeability and porosity.

40. The composition of claim 39, wherein at least a portion of the micropores have an opening length of approximately 0.1 nm to approximately 30 nm, wherein each of the microchannels has an opening length of approximately 100 nm to approximately 600 nm, and wherein each of the voids has an opening length of approximately 30 nm to approximately 80 nm.

41. The composition of claim 29, wherein the granules further comprise a mixture of granules sized from approximately 4 mesh to approximately 14 mesh.

42. The composition of claim 41, wherein the mixture of granules is formed from a combination of granules sized from approximately 8 mesh to approximately 14 mesh and granules sized from approximately 4 mesh to approximately 8 mesh in a percentage by weight of approximately 60%:40%.

43. The composition of claim 29, wherein the granules further comprise a mixture of granules sized from approximately 4 mesh to approximately 20 mesh.

44. The composition of claim 43, wherein the mixture of granules is formed from a combination of granules sized from approximately 8 mesh to approximately 20 mesh and granules sized from approximately 4 mesh to approximately 8 mesh in a percentage by weight of approximately 50%:50%.

45. The composition of claim 29, wherein the granules further comprise a mixture of granules sized from approximately 4 mesh to approximately 50 mesh.

46. The composition of claim 45, wherein the mixture of granules is formed from a combination of granules sized from approximately 20 mesh to approximately 50 mesh and granules sized from approximately 4 mesh to approximately 20 mesh in a percentage by weight of approximately 50%:50%.

47. The composition of claim 29, wherein the granules further comprise a mixture of granules sized from approximately 8 mesh to approximately 20 mesh.

48. The composition of claim 29, wherein the mixture of granules is formed from a combination of granules sized from approximately 14 mesh to approximately 20 mesh and granules sized from approximately 8 mesh to approximately 14 mesh in a percentage by weight of approximately 50%:50%.

49. The composition of claim 29, wherein the granules further comprise a mixture of granules sized from approximately 8 mesh to approximately 50 mesh.

50. The composition of claim 49, wherein the mixture of granules is formed from a combination of granules sized from approximately 20 mesh to approximately 50 mesh and granules sized from approximately 8 mesh to approximately 20 mesh in a percentage by weight of approximately 50%:50%.

51. The composition of claim 29, wherein the composition has a density of approximately 20 lbs/ft$^3$ to approximately 70 lbs/ft$^3$.

52. The composition of claim 29, wherein the composition has a sodium sulfate soundness test weight percent loss total of approximately 10% or less.

53. The composition of claim 52, wherein the composition has a sodium sulfate soundness test weight percent loss total of approximately 5% or less.

54. A method of fabricating a soil amendment composition comprising granules having a minimum hardness and a minimum porosity, wherein the method comprises the steps of:
   admixing solid sacrificial material to a clay composition mixture;
   forming the clay composition mixture into clay granules; and
   flash kilning the clay granules at a temperature of approximately 1,800° F. to approximately 2,000° F. for a duration of approximately 5 minutes to approximately 30 minutes to release and burn out at least a portion of the solid sacrificial material, thereby bloating at least a portion of the clay granules and forming a porous microstructure of interconnecting micropores and microchannels in each of the at least a portion of the clay granules for providing the minimum porosity, and thereby partially vitrifying the at least a portion of the clay granules for providing the minimum hardness;
   wherein the step of admixing sacrificial material further comprises admixing at least one of a gas forming material, an organic lint, and any combination thereof to the composition mixture.

55. The method of claim 54, wherein the step of flash kilning the granules further comprises forming each of the micropores with an opening length of approximately 0.1 nm to approximately 30 nm and forming each of the microchannels with an opening length of approximately 100 nm to approximately 600 nm.

56. The method of claim 54, wherein the step of flash kilning the granules further comprises flash kilning at a temperature and for a duration to obtain an LA Abrasion hardness value of approximately 3 to approximately 60.

57. The method of claim 54, wherein the step of flash kilning the granules further comprises flash kilning at a temperature and for a duration to obtain an absorption capacity of approximately 0.5 ml/g to approximately 2.5 ml/g.

58. The method of claim 54, wherein the step of kilning the granules further comprises flash kilning at a temperature and for a duration to obtain an absorption rate in a 52 mm diameter column of approximately 90 milliliters or more within 10 minutes.

59. A method of fabricating a soil amendment composition comprising granules having a minimum hardness and a minimum porosity, wherein the method comprises the steps of:
   admixing sacrificial material to a composition mixture;
   forming the composition mixture into the granules;
      flash kilning the granules at a temperature of approximately 1,800° F. to approximately 2,000° F. for a duration of approximately 5 minutes to approximately 30 minutes to release and burn out at least a portion of the sacrificial material, thereby bloating at least a portion of the granules and forming a porous microstructure of interconnecting micropores and microchannels in each of the at least a portion of the granules for providing the minimum porosity, and thereby partially vitrifying the at least a portion of the granules for providing the minimum hardness;
   wherein the step of admixing sacrificial material further comprises admixing at least one of a gas forming mineral, an organic lint, an organic dust, and any combination thereof to the composition mixture.

60. A method of fabricating a soil amendment composition comprising granules having a minimum hardness and a minimum porosity, wherein the method comprises the steps of:
   admixing sacrificial material to a composition mixture;
   forming the composition mixture into the granules;
      flash kilning the granules at a temperature of approximately 1,800° F. to approximately 2,000° F. for a duration of approximately 5 minutes to approximately 30 minutes to release and burn out at least a portion of the sacrificial material, thereby bloating at least a portion of the granules and forming a porous microstructure of interconnecting micropores and microchannels in each of the at least a portion of the granules for providing the minimum porosity, and thereby partially vitrifying the at least a portion of the granules for providing the minimum hardness;
   wherein the step of flash kilning the granules further comprises forming each of the micropores with an opening length of approximately 0.1 nm to approximately 30 nm and forming each of the microchannels with an opening length of approximately 100 nm to approximately 600 nm.

61. A method of fabricating a soil amendment composition comprising granules having a minimum hardness and a minimum porosity, wherein the method comprises the steps of:

admixing sacrificial material to a composition mixture;

forming the composition mixture into the granules;

flash kilning the granules at a temperature of approximately 1,800° F. to approximately 2,000° F. for a duration of approximately 5 minutes to approximately 30 minutes to release and burn out at least a portion of the sacrificial material, thereby bloating at least a portion of the granules and forming a porous microstructure of interconnecting micropores and microchannels in each of the at least a portion of the granules for providing the minimum porosity, and thereby partially vitrifying the at least a portion of the granules for providing the minimum hardness;

wherein the step of flash kilning the granules further comprises flash kilning at a temperature and for a duration to obtain an LA Abrasion hardness value of approximately 3 to approximately 60.

62. A method of fabricating a soil amendment composition comprising granules having a minimum hardness and a minimum porosity, wherein the method comprises the steps of:

admixing sacrificial material to a composition mixture;

forming the composition mixture into the granules;

flash kilning the granules at a temperature of approximately 1,800° F. to approximately 2,000° F. for a duration of approximately 5 minutes to approximately 30 minutes to release and burn out at least a portion of the sacrificial material, thereby bloating at least a portion of the granules and forming a porous microstructure of interconnecting micropores and microchannels in each of the at least a portion of the granules for providing the minimum porosity, and thereby partially vitrifying the at least a portion of the granules for providing the minimum hardness;

wherein the step of flash kilning the granules further comprises flash kilning at a temperature and for a duration to obtain an absorption capacity of approximately 0.5 ml/g to approximately 2.5 ml/g.

63. A method of fabricating a soil amendment composition comprising granules having a minimum hardness and a minimum porosity, wherein the method comprises the steps of:

admixing sacrificial material to a composition mixture;

forming the composition mixture into the granules;

flash kilning the granules at a temperature of approximately 1,800° F. to approximately 2,000° F. for a duration of approximately 5 minutes to approximately 30 minutes to release and burn out at least a portion of the sacrificial material, thereby bloating at least a portion of the granules and forming a porous microstructure of interconnecting micropores and microchannels in each of the at least a portion of the granules for providing the minimum porosity, and thereby partially vitrifying the at least a portion of the granules for providing the minimum hardness;

wherein the step of kilning the granules further comprises flash kilning at a temperature and for a duration to obtain an absorption rate in a 52 mm diameter column of approximately 90 milliliters or more within 10 minutes.

* * * * *